United States Patent
Ro et al.

(10) Patent No.: US 9,722,681 B2
(45) Date of Patent: *Aug. 1, 2017

(54) APPARATUS AND METHOD FOR TRANSMISSION OF SOUNDING REFERENCE SIGNAL IN UPLINK WIRELESS COMMUNICATION SYSTEMS WITH MULTIPLE ANTENNAS AND SOUNDING REFERENCE SIGNAL HOPPING

(71) Applicant: Samsung Electronics Co., Ltd., Gyeonggi-do (KR)

(72) Inventors: Sang Min Ro, Seoul (KR); Joon Young Cho, Gyeonggi-do (KR); Ju Ho Lee, Gyeonggi-do (KR); Yingyang Li, Beijing (CN); Jin Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 131 days.

This patent is subject to a terminal disclaimer.

(21) Appl. No.: 14/790,353

(22) Filed: Jul. 2, 2015

(65) Prior Publication Data

US 2015/0304006 A1 Oct. 22, 2015

Related U.S. Application Data

(63) Continuation of application No. 14/607,796, filed on Jan. 28, 2015, now Pat. No. 9,100,077, which is a (Continued)

(30) Foreign Application Priority Data

Jun. 20, 2008 (KR) ........................ 10-2008-0058581
Jun. 27, 2008 (KR) ........................ 10-2008-0061952

(51) Int. Cl.
*H04B 7/06* (2006.01)
*H04L 5/00* (2006.01)
(Continued)

(52) U.S. Cl.
CPC ........... *H04B 7/0608* (2013.01); *H04B 1/713* (2013.01); *H04B 1/715* (2013.01); *H04B 7/0684* (2013.01);
(Continued)

(58) Field of Classification Search
CPC .... H04B 7/0608; H04B 7/0684; H04B 1/713; H04L 5/0051; H04W 72/0413
See application file for complete search history.

(56) References Cited

U.S. PATENT DOCUMENTS 6,137,787 A 10/2000 Chawla et al.
6,766,146 B1 7/2004 Park et al.
(Continued)

FOREIGN PATENT DOCUMENTS

CN 1655555 8/2005
CN 101005335 7/2007
(Continued)

OTHER PUBLICATIONS

Panasonic, "Sounding RS Parameters", R1-081201, 3GPP TSG RAN WG1 Meeting #52bis, Mar. 31-Apr. 4, 2008, 7 pages.
(Continued)

*Primary Examiner* — Rasheed Gidado
(74) *Attorney, Agent, or Firm* — The Farrell Law Firm, P.C.

(57) ABSTRACT

Disclosed is a sounding reference signal transmission method which is efficient in an uplink wireless telecommunications system using a multiple antenna technique and sounding reference signal hopping. A terminal is equipped with a plurality of antennas, and a base station receives the sounding reference signal transmitted from these antennas and estimates the uplink channel state of each antenna. The sounding reference signal performs frequency hopping so that the base station determines the channel condition for the
(Continued)

entire bandwidth to which data is transmitted in the uplink system. In this environment, the sounding reference signal is transmitted through an antenna pattern through the entire data transmission bandwidth of the uplink system for each antenna of the terminal without additional overhead.

20 Claims, 13 Drawing Sheets

Related U.S. Application Data continuation of application No. 13/720,550, filed on Dec. 19, 2012, now Pat. No. 8,976,836, which is a continuation of application No. 12/489,064, filed on Jun. 22, 2009, now Pat. No. 8,374,213.

(51) Int. Cl.
| | |
|---|---|
| *H04W 72/04* | (2009.01) |
| *H04B 1/713* | (2011.01) |
| *H04B 1/715* | (2011.01) |
| *H04B 7/08* | (2006.01) |
| *H04J 13/00* | (2011.01) |

(52) U.S. Cl.
CPC ......... *H04B 7/0897* (2013.01); *H04L 5/0016* (2013.01); *H04L 5/0048* (2013.01); *H04L 5/0051* (2013.01); *H04W 72/04* (2013.01); *H04W 72/0413* (2013.01); *H04B 2201/698* (2013.01); *H04J 13/0074* (2013.01)

(56) References Cited

U.S. PATENT DOCUMENTS

| 6,771,618 | B1 | 8/2004 | Ueda |
| 6,907,270 | B1 | 6/2005 | Blanz |
| 8,046,029 | B2 | 10/2011 | Teo et al. |
| 8,086,272 | B2 | 12/2011 | Teo et al. |
| 9,025,471 | B2 * | 5/2015 | Mehta ................. H04B 1/713 370/252 |
| 2005/0113101 | A1 | 5/2005 | Hansen et al. |
| 2005/0249114 | A1 | 11/2005 | Mangin et al. |
| 2005/0260997 | A1 | 11/2005 | Korale et al. |
| 2006/0013285 | A1 | 1/2006 | Kobayashi et al. |
| 2007/0197228 | A1 | 8/2007 | McGary et al. |
| 2008/0232449 | A1 | 9/2008 | Khan et al. |
| 2008/0267165 | A1 | 10/2008 | Bertrand et al. |
| 2009/0034447 | A1 | 2/2009 | Yu et al. |
| 2009/0042615 | A1 | 2/2009 | Teo et al. |
| 2009/0278742 | A1 | 11/2009 | Mehta et al. |
| 2010/0027697 | A1 | 2/2010 | Malladi et al. |
| 2010/0035611 | A1 * | 2/2010 | Montojo ............... H04J 11/0069 455/434 |
| 2010/0069028 | A1 * | 3/2010 | Choi .................... H04B 7/0602 455/136 |
| 2013/0107840 | A1 | 5/2013 | Ro et al. |

FOREIGN PATENT DOCUMENTS

| CN | 101043290 | 9/2007 |
| EP | 1 220 557 | 7/2002 |
| JP | 2006-033480 | 2/2006 |
| KR | 1020010015251 | 2/2001 |
| RU | 2 193 289 | 11/2002 |
| RU | 2 292 655 | 1/2007 |
| WO | WO 2007/089681 | 8/2007 |
| WO | WO 2007/114804 | 10/2007 |
| WO | WO 2008/055179 | 5/2008 |
| WO | WO 2008/058112 | 5/2008 |

OTHER PUBLICATIONS

Chinese Office Action dated Sep. 27, 2016 issued in counterpart application No. 201310412193.7, 10 pages.
Nokia Siemens Networks, Nokia, "Frequency Hopping Arrangement for SRS", 3GPP TSG RAN WG1 Meeting #52bis, R1-081445, Mar. 26, 2008.
Neelesh B. Mehta et al., "Antenna Selection Training in MIMO-OFDM/OFDMA Cellular Systems", 13th European Wireless 2007 Conference, Apr. 30, 2007.
Mitsubishi Electric, "UL Sounding RS Protocol Design for Antenna Selection", R1-073356, 3GPP RAN1#50, Aug. 20-24, 2007.

* cited by examiner

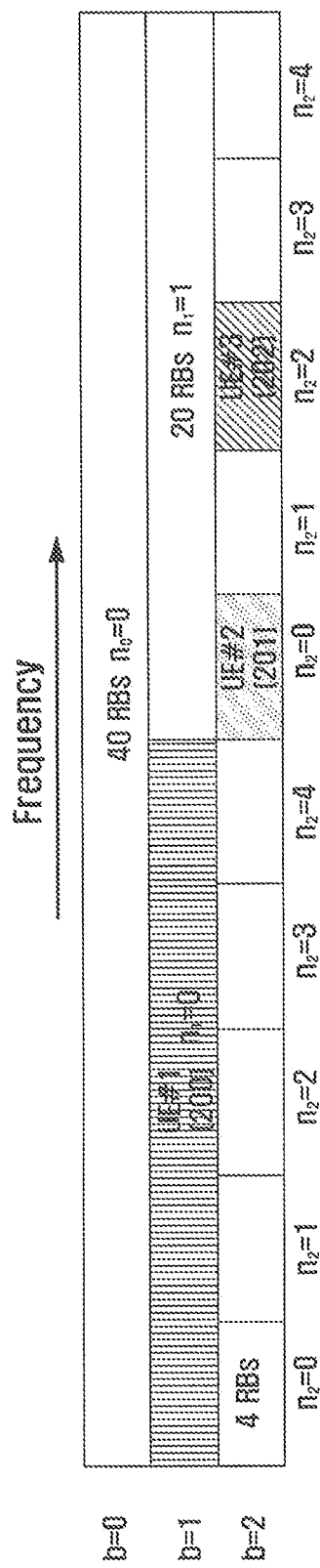

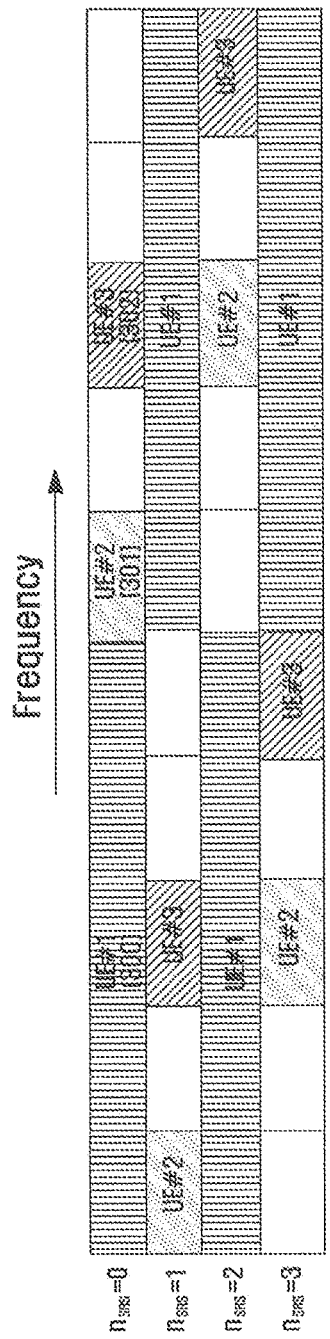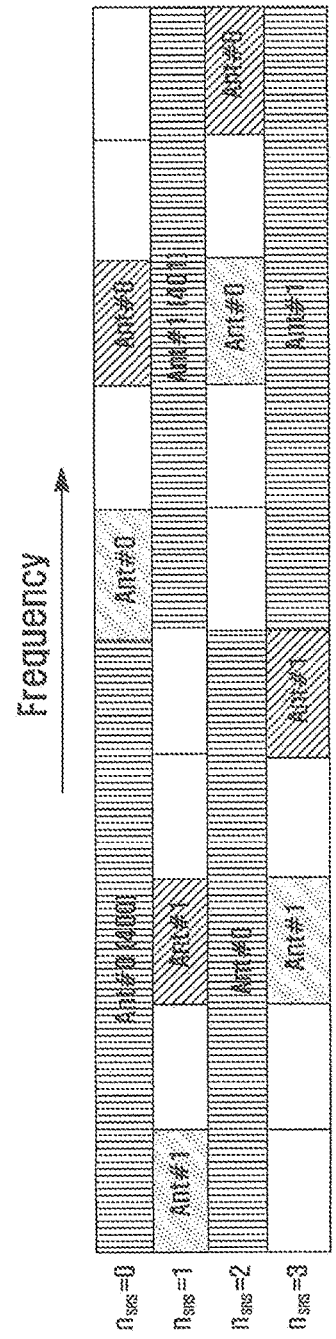

FIG. 5

APPARATUS AND METHOD FOR TRANSMISSION OF SOUNDING REFERENCE SIGNAL IN UPLINK WIRELESS COMMUNICATION SYSTEMS WITH MULTIPLE ANTENNAS AND SOUNDING REFERENCE SIGNAL HOPPING

PRIORITY

This application is a Continuation of U.S. application Ser. No. 14/607,796, which was filed in the U.S. Patent and Trademark Office on Jan. 28, 2015, which is a Continuation of U.S. application Ser. No. 13/720,550, which was filed in the U.S. Patent and Trademark Office on Dec. 19, 2012, and issued as U.S. Pat. No. 8,976,836 on Mar. 10, 2015, which is a Continuation of U.S. application Ser. No. 12/489,064, which was filed in the U.S. Patent and Trademark Office on Jun. 22, 2009, and issued as U.S. Pat. No. 8,374,213 on Feb. 12, 2013, and claims priority under 35 US.C. §119(a) to Korean Patent Applications filed in the Korean Intellectual Property Office on Jun. 20, 2008 and Jun. 27, 2008 and assigned Serial Nos. 10-2008-0058581 and 10-2008-0061952, respectively, the entire contents of each of which are incorporated herein by reference.

BACKGROUND OF THE INVENTION

1. Field of the Invention

The present invention relates to an apparatus and method for generating a SRS transmit antenna pattern in an uplink wireless telecommunications system using multiple antennas and Sounding Reference Signal (SRS) hopping.

2. Description of the Related Art

In a wireless telecommunications system, the multiple antenna technique is used as one method for improving uplink performance. As a representative example, the Long Term Evolution (LTE) which is a next generation mobile communication system of the asynchronous cellular mobile communication standard group 3rd Generation Partnership Project (3GGP) also applies an antenna selective transmission diversity in Single Carrier Frequency Division Multiple Access (SC-FDMA) based uplink such that the performance can be improved through a space-diversity gain in an uplink.

Moreover, a terminal transmits SRS in order that a base station can acquire information of the uplink. The base station receives the SRS and obtains channel state information of the uplink band and, based on the information, performs frequency selective scheduling, power control, timing estimation and Modulation and Coding Scheme (MCS) level selection. Particularly, in the case where the terminal uses the antenna selective transmission diversity method, the base station selects an antenna having the best channel state among the uplink channel states measured from SRS transmitted from each antenna of the terminal. The terminal obtains a diversity gain by performing an uplink transmission through the selected antenna. To perform the above processes, the base station needs to determine the channel state of the entire band to which uplink data is transmitted for each terminal antenna. This becomes possible when the terminal transmits SRS throughout the uplink data transmission bandwidth for each antenna.

FIG. 1 illustrates an example of LTE uplink transfer structure. As shown in FIG. 1, a subframe 100 having the length 1 ms, which is a base unit of LTE uplink transfer, is comprised of two 0.5 ms slots 101. Assuming that the Cyclic Prefix (CP) has a usual length, each slot is comprised of seven symbols 102 while one symbol corresponds to one SC-FDMA symbol. A Resource Block (RB) 103 is a resource allocation unit corresponding to twelve subcarriers in a frequency domain, and one slot in a time domain. The structure of the uplink of the LTE is classified into a data region 104 and a control region 105. The data region is a series of communications resource including data such as voice data, packet data transmitted to each terminal, and corresponds to the resources except for the control region within the subframe. The control region is a series of communications resources including a downlink channel quality report from each terminal, a reception ACKnowledgement/Negative ACKnowledgement (ACK/NACK) for the downlink signal, and an uplink scheduling request.

As shown in FIG. 1, the time when the SRS can be transmitted within one subframe is an SC-FDMA symbol duration which is the final duration while the SRS is transmitted through a data transmission band on a frequency basis. The SRSs of various terminals transmitted through the final SC-FDMA of the same subframe can be classified according to the location of frequency. Moreover, the SRS is comprised of a Constant Amplitude Zero Auto Correlation (CAZAC) sequence, and SRSs transmitted from various terminals are a CAZAC sequence which has a different cyclic shift value. Each of the CAZAC sequences generated through a cyclic shift from one CAZAC sequence has the correlation value of zero with respect to the sequences having a different cyclic shift value. By utilizing such characteristics, the SRSs of the same frequency domain can be classified according to the CAZAC sequence cyclic shift value. The SRS of each terminal is allocated in the frequency domain based on the tree structure set in the base station. The terminal performs the SRS hopping to transmit the SRS to the entire uplink data transmission bandwidth in this tree structure.

FIG. 2 illustrates an example of an SRS allocation method for the tree structure set by a base station in a data transmission band corresponding to 40RB on a frequency basis.

In this example, assuming that the level index of the tree structure is b, the most upper level (b=0) is comprised of one SRS BandWidth (BW) unit of 40RB bandwidth. In the second level (b=1), two SRS BWs of 20RB bandwidth are generated from the SRS BW of b=0 level. Therefore, two SRS BWs can exist in the whole data transmission band. In the third level (b=2), five 4RB SRS BWs are generated from one 20RB SRS BW of the very upper level (b=1) so that it has a structure where ten 4RB SRS BWs exist within one level. The configuration of this tree structure can have a number of various levels, the SRS bandwidth and the number of SRS BWs per one level is set according to the setting of base station. The number of SRS BW of the level b generated from one SRS BW of the upper level is defined as $N_b$, and the index of SRS BW of $N_b$ is defined as $n_b=[0, \ldots, N_b-1]$. In the example shown in FIG. 2, a user 1 200 is allocated to the first SRS BW ($n_1=0$) among two SRS BWs having 20RB bandwidth at b=1 level. A user 2 201 and a user 3 202 are allocated to the location of the first SRS BW ($n_2=0$) and third SRS BW ($n_2=2$) under the second 20RB SRS BW. In this way, the conflict between terminal SRSs can be avoided and allocated based on the tree structure shown in the example.

FIG. 3 illustrates the SRS hopping transmission structure for the case in which a terminal does not use an antenna selective transmission diversity.

The $n_{SRS}$ is an SRS transmission point of time index, while having the value of 0, 1, 2, . . . . In this way, the SRS transmission for the entire uplink data transmission band becomes possible by performing the SRS hopping in the tree structure which is particular to a cell. In the case where the antenna selective transmission diversity method is supported in the LTE uplink system, the terminal transmits the SRS to each antenna so that base station may provide channel information to determine the terminal transmit antenna. Since the terminal performs the uplink transmission by always using a single antenna in the LTE system, the terminal alternately uses two antennas at the point in time of the SRS transmission while, at the same time, performing the SRS hopping shown in FIG. 3.

FIG. 4 illustrates an example of antenna pattern which transmits SRS when a terminal supports an antenna selective transmission diversity and performs an SRS hopping in the LTE system.

As shown FIG. 4, the conventional SRS transmit antenna pattern which uses a terminal antenna for the SRS transmission by turns result in transmitting the SRS to a frequency location which is restricted for each antenna. Accordingly, there is a problem in that each antenna cannot transmit an SRS to the entire uplink data transmission band. For example, assuming that two antennas of the user 1 allocated in FIG. 3 are Ant#0 300 and Ant#1 301, the Ant#0 always transmits the SRS to the left half of the uplink data band, while the Ant#1 transmits the SRS to the right half. Similar problems occur with respect to the user 2 and 3.

SUMMARY OF THE INVENTION

The present invention has been made in view of the above problems, and provides an SRS transmit antenna pattern in which each antenna of a terminal is capable of transmitting SRS to an entire uplink data transmission band in an uplink environment using multiple antennas when SRS hopping is enabled. The present invention further provides an apparatus and operation procedure of a base station and terminal for the application of the SRS transmit antenna pattern.

In accordance with an aspect of the present invention, a method of SRS transmission in a UE in a communications system supporting multiple antennas and SRS hopping includes identifying a transmission time of the SRS, setting a transmission band for transmitting the SRS, generating the SRS to be transmitted to a base station, determining an antenna index for transmitting the SRS, and transmitting the SRS to the base station according to the antenna index, wherein the antenna index is determined by a function based on the transmission time, a UE-specific parameter for an SRS bandwidth and a frequency hopping parameter of the SRS.

In accordance with another aspect of the present invention, a method of SRS reception in a base station in a communications system supporting multiple antennas and SRS hopping includes identifying an SRS reception time, receiving the SRS through a predetermined transmission band at the SRS reception time, and determining which antenna of a user equipment (UE) transmitted the SRS by supporting an antenna index, wherein the antenna index is determined by a function based on a transmission time, a UE specific parameter for an SRS bandwidth and a frequency hopping parameter of the SRS.

In accordance with another aspect of the present invention, an apparatus for transmitting an SRS in a mobile communications system supporting multiple antennas and SRS hopping includes an SRS hopping generator for identifying a transmission time and setting a transmission band for transmitting the SRS, an SRS sequence generator for generating an SRS to be transmitted to a base station, an SRS transmit antenna index generator for determining an antenna index for transmitting the SRS, and an SRS transmit antenna selector for transmitting the SRS to the base station according to the antenna index, wherein the antenna index is determined by a function based on the transmission time, a UE specific parameter for an SRS bandwidth and a frequency hopping parameter of the SRS.

In accordance with another aspect of the present invention, an apparatus for receiving an SRS in a mobile communications system supporting multiple antennas and SRS hopping includes a communication unit for receiving the SRS through a predetermined transmission band at an SRS reception time, and an SRS transmit antenna decision unit for determining which antenna of a UE transmitted the SRS by supporting an antenna index, wherein the antenna index is determined by a function based on a transmission time, a UE-specific parameter for an SRS bandwidth and a frequency hopping parameter of the SRS.

BRIEF DESCRIPTION OF THE DRAWINGS

The objects, features and advantages of the present invention will be more apparent from the following detailed description in conjunction with the accompanying drawings, in which:

FIG. 2 is a drawing illustrating an example of a sounding reference signal allocation method in an LTE uplink system;

FIG. 3 is a drawing illustrating an example of a sounding reference signal hopping structure in an LTE uplink system;

FIG. 4 is a drawing illustrating an example of a sounding reference signal transmit antenna pattern where an antenna selective transmission diversity method is supported by using two antennas;

FIG. 5 is a drawing illustrating another example of a sounding reference signal transmit antenna pattern according to an embodiment of the present invention in case a terminal is equipped with two antennas;

DETAILED DESCRIPTION OF PREFERRED EMBODIMENTS

Figure 1:
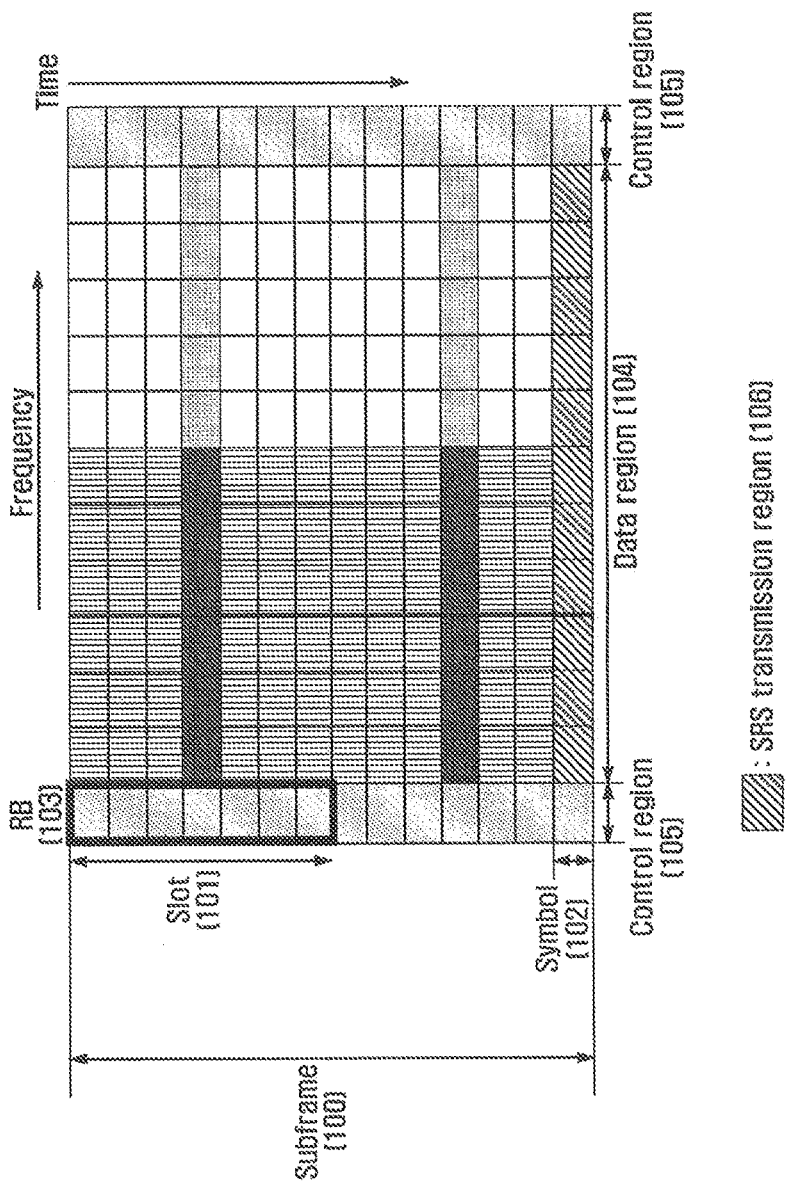
FIG. 1 is a drawing illustrating an example of an LTE uplink system transmission structure.

Exemplary embodiments of the present invention are described with reference to the accompanying drawings. The same reference numbers are used throughout the drawings to refer to the same or like parts. Detailed descriptions of well-known functions and structures incorporated herein may be omitted to avoid obscuring the subject matter of the present invention.

The present invention is not limited to the LTE system, and examples which will be described herein can be applicable to all uplink systems including OFDMA where a terminal uses multiple antennas. Moreover, in the present invention, the concept that the terminal uses a multiple antenna all includes the technique which is used for a space diversity and space multiplexing in which channel information obtained from an SRS which is transmitted from each antenna of the terminal is transceived to a plurality of antennas, besides the antenna selective transmission diversity. Finally, the present invention is not limited to a specific system mentioned in a specification, and is applicable as a solution for a situation where an SRS transmitted by the antennas of the terminal is limited to a part of the uplink system bandwidth in a sounding technique through the multiple antenna.

The present invention provides an efficient SRS transmit antenna pattern by which the base station can obtain the channel information of the entire uplink data transmission band for each antenna of the terminal in the uplink using the multiple antennas and SRS hopping. The present invention sets up a time necessary for transmitting an SRS for the entire data transmission band by each antenna as a period of antenna pattern, and generates an antenna pattern by changing the method for applying an SRS transmit antenna index to each section by dividing the antenna pattern period according to the number of antennas and the number of SRS BWs, when Sounding Reference Signal hopping is enabled.

Here, the SRS transmit antenna index is a pointer that indicates the antenna of a terminal which transmits the SRS.

The present invention solves the disadvantage of the prior art described above, that is, the problem that each antenna of the terminal transmits the SRS to a specific limited band, by providing an SRS transmit antenna pattern. Moreover, a function which determines the pattern of the SRS transmit antenna are predefined between a base station and a terminal using the antenna selective transmission diversity method while the number of terminal transmit antennas and the number of SRS BWs is set as an input variable, so that additional overhead is not required for the operation of the present invention. The technology suggested in the present invention is illustrated in detail in the below embodiments.

First Embodiment

In a first embodiment, in the case where a terminal has two antennas in the LTE system, the SRS transmit antenna pattern is illustrated.

Figure 5:
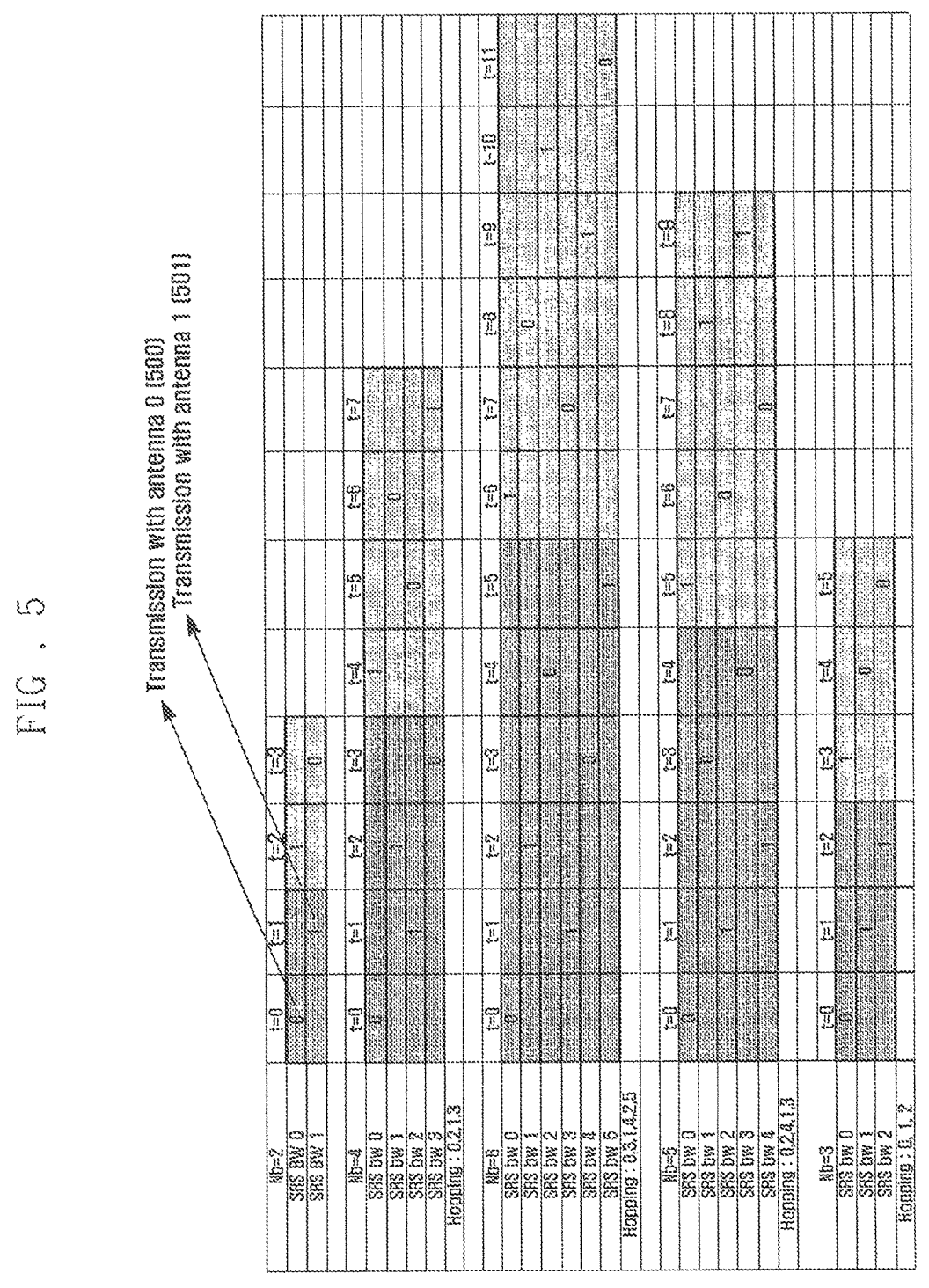

FIG. 5 illustrates an example of the SRS transmit antenna pattern, and illustrates an SRS transmit antenna index 500, 501 pattern according to the point of time t which transmits SRS in the case where SRS BWs of $N_b$ ($N_b=\{2, 3, 4, 5, 6\}$) exist per one level in the tree structure. At this time, when the number of terminal antennas is M and the number of points intime of the SRS transmission necessary for transmitting SRS to the entire data transmission band by each antenna is K, it becomes $K=M*N_b$.

In the drawing, if two antennas are used in turn for the SRS transmission according to the prior art, it can be easily predicted that a specific SRS BW is always transmitted through only one antenna. For example, in the case of $N_b=2$, when the antenna is used in turns, the SRS BW0 is always transmitted to the antenna 0 and the SRS BW1 is transmitted to the antenna 1. Here, t is the point of time of the SRS transmission while having the value of t=0, 1, 2, ... and is defined as t'=t mod K. That is, the SRS transmit antenna pattern is repeated with a period K. In the present invention, the transmission point of time is determined as the slot unit, the sub frame unit, a plurality of sub frame units, the frame unit or a plurality of frame units, and can be set between the transceives as an upper signaling or transceivers can each store a predefined value. That is, in the drawing of the present invention for the convenience of illustration, the transmission point of time appears to be continuous. The transmission point of time is isolated with a given interval or can be continuous according to a setting. This definition of the transmission point of time should be applied in common to all embodiments of the present invention.

In FIG. 5, the terminal transmits an SRS by using two antennas 0, 1 in turns for two SRS transmission points of time corresponding to the number of the SRS transmission band, that is, for t'=0, 1 (a first transmission section).

In the next two SRS transmission points of time t'=2, 3 (a second transmission section), the SRS is transmitted by exchanging the order of the antenna index so that the SRS may not be transmitted through the same antenna in the first transmission section of the same SRS transmission band and the second transmission section. In this way, the SRS transmission point of time is grouped by corresponding to the number of the SRS transmission band, so that the above pattern is repeated in the SRS transmission point of time section of t'=0 ..., K/2−1, which is the first transmission section.

In the remaining SRS transmission sections t'=K/2, ..., K−1, which is the second transmission section, a complement antenna index is applied to the antenna index transmitted from the first transmission section of the previous t'=0, ..., K/2−1 so that the SRS may not be transmitted through the same antenna in the first transmission section of the same SRS transmission band and the second transmission section. In the drawing, the value expressed as "Hopping" below the SRS BW means a SRS BW index value hopped by the above-described conventional SRS hopping pattern. This antenna transmission pattern T (t') is expressed in Equation (1).

$$T[t'] = \begin{cases} t' \bmod 2 & \text{for } 0 \le t' < K/2 \text{ and } \lfloor t'/2 \rfloor \bmod 2 = 0 \\ [t'+1] \bmod 2 & \text{for } 0 \le t' < K/2 \text{ and } \lfloor t'/2 \rfloor \bmod 2 = 1 \\ [T[t'-K/2]+1] \bmod 2 & \text{for } K/2 \le t' < K \end{cases} \quad (1)$$

If the SRS transmit antenna pattern T(t') generated by the above described method is used, the terminal can transmit the SRS for each antenna through the entire data transmission band. Moreover, as an example of another transmission pattern of the present invention, a new transmission pattern can be generated by applying a complement antenna index to the generated T(t'). That is, the new transmission pattern T'(t') can be generated as T'(t')=(T(t')+1)mod 2. In the meantime, if Equation (1) is expressed with another method according to another embodiment of the present invention, it becomes Equation (1-1). Here, it should be noted that Equation (1) and Equation (1-1) are only different in the expression but identical in the principle of generating the SRS transmit antenna pattern.

$$a[n_{SRS}] = \begin{cases} [n_{SRS} + \lfloor n_{SRS}/2 \rfloor + \beta \cdot \lfloor n_{SRS}/K \rfloor] \mod 2 & \text{when } K \text{ is even} \\ n_{SRS} \mod 2 & \text{when } K \text{ is Odd} \end{cases}$$

$$\beta \begin{cases} 1 & \text{where } K \mod 4 = 0 \\ 0 & \text{otherwise} \end{cases}$$

$$K = \prod_{b'=b_{hop}}^{B_{SRS}} N_{b'}$$

(1-1)

Here, the 'b_hop' is a parameter for determining the frequency domain in which the SRS frequency hopping is available, while the hopping is possible in the sounding frequency domain of all sections when it is 'b_hop=0'. Moreover, 'B_SRS' is a level index of tree structure, and is matched to the above-described 'b'. As described above, the 'Nb' is the number of the SRS BW at level 'B_SRS' (or level b'). Hereinafter, referring to FIG. 3 and FIG. 5, the process of generating the SRS transmit antenna index by Equation (1-1) will be exemplified in detail. In this case, it is known that Equation (1) and Equation (1-1) generate the same SRS transmit antenna index.

Firstly, in the UE1 of FIG. 3, as it is 'b=1', when it is applied to $$K = \prod_{b'=b_{hop}}^{B_{SRS}} N_{b'},$$

becomes $$K = \prod_{b'=0}^{1} N_{b'} = 1 \cdot 2 = 2.$$

Accordingly, since K is not a multiple of 4 while being an even number, the beta value becomes 0. Then, the equation becomes a(n_SRS)=(n_SRS+floor(n_SRS/2))mod 2. As the n_SRS value is increased 0, 1, 2, . . . , the antenna transmission pattern is determined in the order of a(0)=0, a(1)=1, a(2)=1, a(3)=0, a(4)=0, a(5)=1, a(6)=1, a(7)=0. As described above, UE1 indicates the case in which the SRS divides the entire sounding frequency band into two in order to transmit. Therefore, the description of the UE1 of FIG. 3 can be identically applied to the case of 'Nb=2' in FIG. 5.

In the meantime, in the UE2 and UE3 of FIG. 3, as it is 'b=2', the equation becomes $$K = \prod_{b'=0}^{2} N_{b'} = 1 \cdot 2 \cdot 5 = 10.$$

Accordingly, since K is not a multiple of 4 while being an even number, the beta value becomes 0. In this case, it is known that 0, 1, 1, 0 is repeated when a(n_SRS) is calculated.

According to an embodiment of the present invention, the antenna pattern can be "0110" when the number of the SRS band is an even number, and the antenna pattern can be a repetition of "01" when the number of the SRS band is an odd number. The 0 of the antenna pattern 0110 is the index of a first antenna, and the 1 of the antenna pattern 0110 is the index of a second antenna.

In FIG. 5, in the case of 'Nb=4' and the case of 'Nb=6', it is known that each case has a different transmit antenna pattern. The number of transmitted SRSs, that is, in the case of Nb is an even number while being a multiple of 4, the pattern of 0, 1, 1, 0, 1, 0, 0, 1 is repeated, whereas the pattern of 0, 1, 1, 0 is repeated in the case of Nb is an even number while not being a multiple of 4. It results from the condition $$\beta = \begin{cases} 1 & \text{where } K \mod 4 = 0 \\ 0 & \text{otherwise} \end{cases}$$

which is indicated in Equation (1-1). Accordingly, it can be confirmed that Equation (1) and Equation (1-1) are different only in the expression but the principle of generating the SRS transmit antenna pattern is identical.

Figure 6:
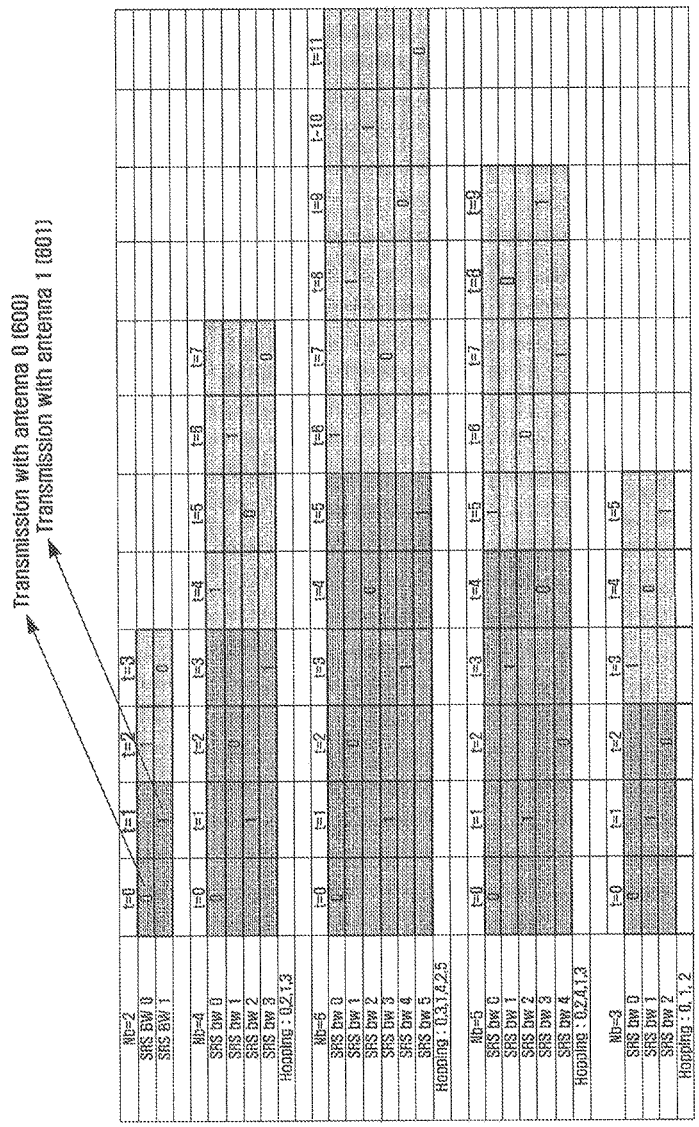
FIG. 6 is a drawing illustrating an example of a sounding reference signal transmission structure according to an embodiment of the present invention in case a terminal is equipped with two antennas.

FIG. 6 illustrates a second example applicable to the first embodiment of the present invention.

In this case, the antenna pattern for the SRS transmission point of time section of t'=0, . . . , K/2−1 section, which is the first transmission point of time section, uses the antenna 0 (600), 1 (601) in turns for the SRS transmission identically with the prior art. That is, the antenna pattern used in the first transmission point of time section repeats 0, 1, 0, 1 . . . . However, in the section of t'=K/2, . . . , K−1, which is the second transmission point of time section, an antenna index which is the complement of the transmit antenna index of the previous t'=0, . . . , K/2−1 section is applied so that the SRS is not transmitted through the same antenna in the same SRS transmission band.

In the drawing, it can be confirmed that each antenna transmits SRS through the entire data transmission band. This antenna transmission pattern T (t') is expressed in Equation (2).

$$T[t'] = \begin{cases} t' \mod 2 & \text{for } 0 \leq t' < K/2 \\ [T[t' - K/2] + 1] \mod 2 & \text{for } K/2 \leq t' < K \end{cases}$$

(2)

Moreover, as an example of another transmission pattern of the present invention, an antenna index which is a complement for the generated T (t') is applied to generate a new transmission pattern. That is, a new transmission pattern T'(t') can be generated as T'(t')=(T(t')+1)mod 2.

Figure 7:
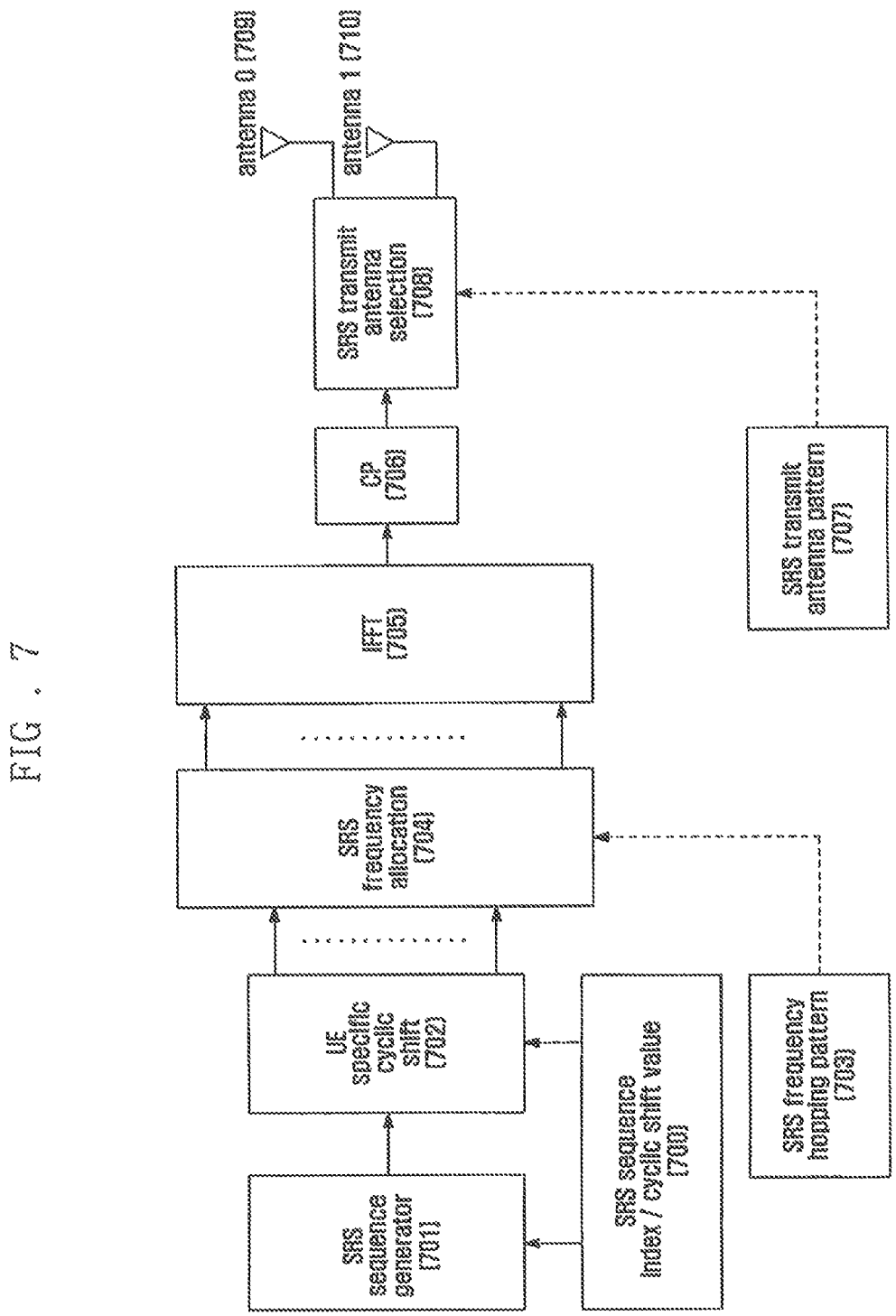
FIG. 7 is a drawing illustrating a terminal transmission apparatus according to an embodiment of the present invention.
Figure 8:
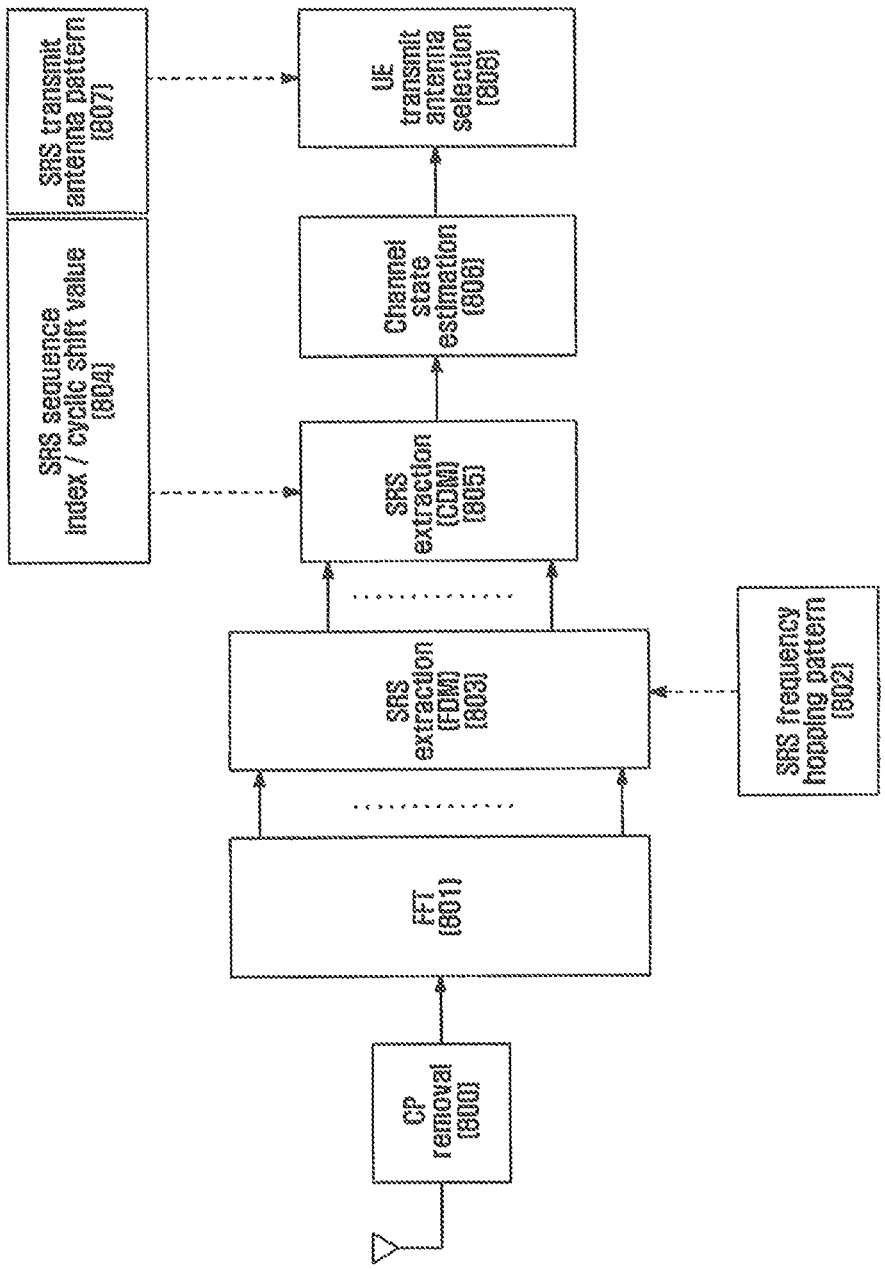
FIG. 8 is a drawing illustrating a base station reception apparatus according to an embodiment of the present invention.

FIG. 7 and FIG. 8 are drawings of transmission of at a terminal and reception of at abase station respectively when the first embodiment of the present invention is applied.

Referring to FIG. 7, an SRS sequence generator 701 receives an index 700 of the SRS sequence (CAZAC sequence) which is allocated to itself from a base station and generates an SRS sequence. A cyclic shift unit 702 receives the generated SRS sequence from the SRS sequence generator 701, and shifts as much as the cyclic shift value by using the cyclic shift value 700 allocated to itself from the base station. The SRS hopping pattern generator 703 allocates a frequency location for transmitting the SRS in an uplink band through an arbitrary antenna, that is, the SRS transmission band according to a pattern predetermined with the base station. At this time, the generated SRS hopping pattern is a pattern which is predefined between the base station and the terminal. The allocated SRS is transformed to an SC-FDMA symbol through Inverse Fast Fourier Transform (IFFT) 705 and then, a CP insertion 706 is performed. An SRS transmit antenna index generator 707, in each transmission point of time, generates a pattern of antenna index for transmitting the SRS through the SRS transmission band allocated by the SRS hopping pattern generator 703. The antenna pattern can be 0110, wherein 0 of the antenna pattern 0110 is the index of a first antenna and 1 of the antenna pattern 0110 is the index of a second antenna. In this case, the SRS transmit antenna index generator 707 maps an arbitrary antenna with the set SRS transmission band during the first transmission section to successively transmit the SRS in each transmission point of time, while generating an antenna index so that the SRS may not be transmitted through the same antenna in the same SRS transmission band during the second transmission section. An SRS transmit antenna selection unit 708 selects the SRS transmit antenna of the terminal according to the antenna index determined by the SRS transmit antenna generator 707. Then, the SRS is transmitted to the base station through one of an antenna 0 709 or an antenna 1 710.

Referring to FIG. 8, after performing a CP removal 800 process for the SRS signal received from the terminal, the base station transforms the SRS signal into a frequency domain through Fast Fourier Transform (FFT) 801. The base station separates the SRS of different terminals 803 from the frequency domain through an SRS frequency separator 803, with reference to the hopping pattern, which is generated from the SRS frequency hopping generator 802, predefined between the base station and the terminal.

Thereafter, the base station separates the SRS of the terminals which is multiplexed to the same frequency domain through an SRS code separator 805 from a code domain by using the SRS sequence index and the cyclic shift value 804 assigned to each terminal. A channel state estimator 806 estimates an uplink channel state through the SRS of each separated terminal. The base station determines which number antenna was used to transmit the SRS which is received by the current base station from a SRS transmit antenna decision unit. Finally, the base station compares a channel estimation value which is obtained from the SRS received from each antenna of the terminal through an antenna selector 808 and performs a selection of an antenna which has the best channel condition as a transmit antenna of the terminal.

Figure 9:
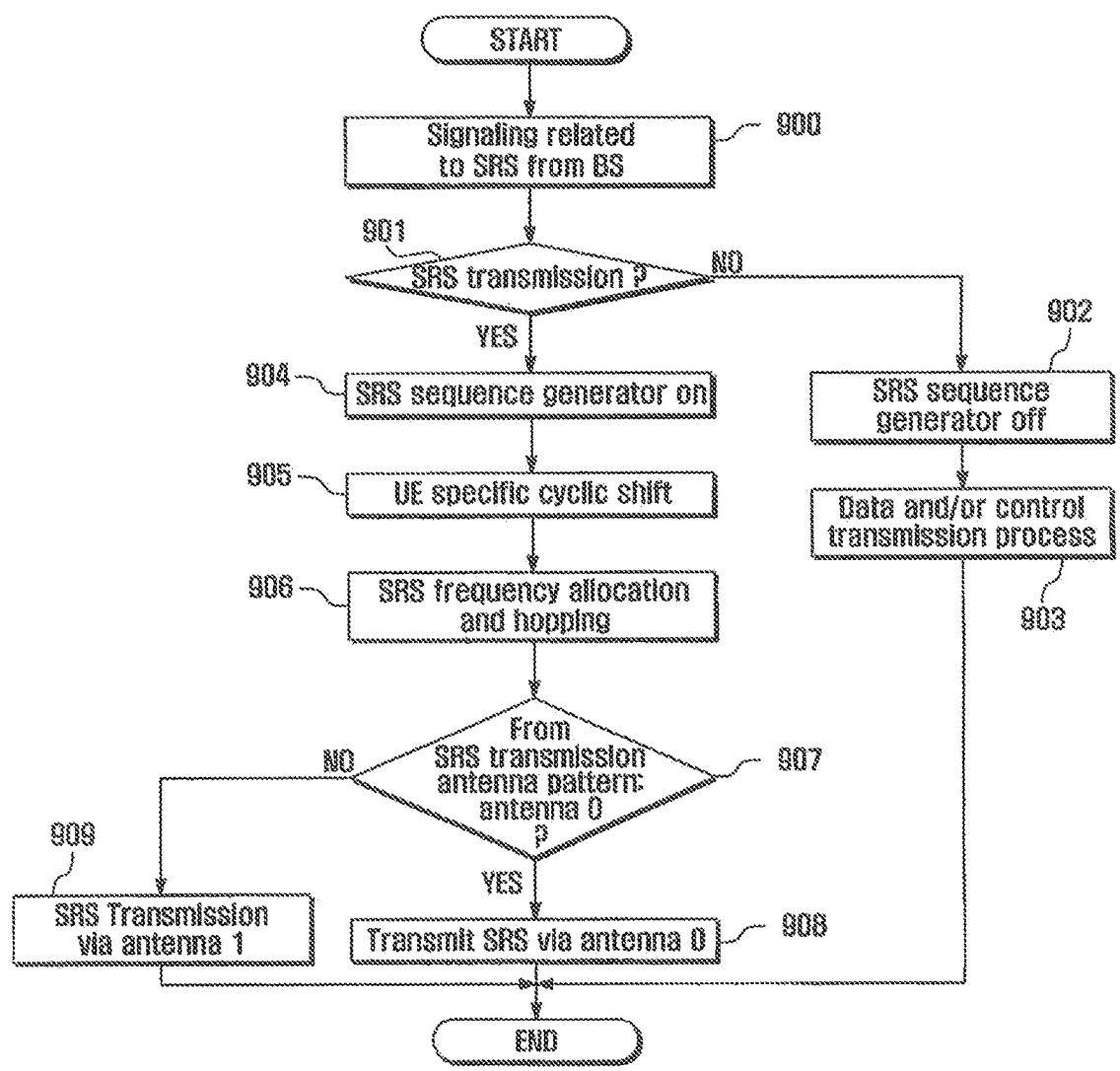
FIG. 9 is a drawing illustrating a signal transmission operation procedure of a terminal according to an embodiment of the present invention.

FIG. 9 is a drawing illustrating a signal transmission operation procedure of a terminal according to the first embodiment of the present invention.

Referring to FIG. 9, the terminal receives signaling parameters (e.g. SRS transmission period, frequency allocation location) necessary for the SRS transmission from the base station in step 900. The terminal determines, based on these parameters, whether the current transmission is an SRS transmission point of time in step 901. In case it is not an SRS transmission point of time, the terminal turns the SRS generator off in step 902 and performs a data/control information transmission process in step 903. If it is determined as an SRS transmission point of time, by using the SRS sequence generator 701 and the cyclic shift unit 702, the terminal generates an SRS for transmitting to the base station. For this, firstly the terminal performs an operation in step 904 of the SRS sequence generator, performs a cyclic shift in step 905 of the SRS sequence which is generated here so that the code domain multiplexing with other terminal becomes possible. Then, the SRS hopping pattern generator 703 of terminal allocates the SRS transmission band for transmitting the generated SRS in step 906, but the allocation position of SRS is determined according to an initial allocation information from the SRS hopping pattern and the base station. Thereafter, the SRS transmit antenna index generator 707 of the terminal determines a first transmission section and a second transmission section so as to correspond to the number of the SRS transmission band, and generates the SRS transmit antenna index in such a manner that the antenna which transmits the SRS should not be overlapped in the same SRS transmission band of the first transmission section and the second transmission section. The SRS transmit antenna selector selects an antenna for transmitting a corresponding SRS from the generated SRS transmit antenna index in step 907, and transmits the SRS to antenna 0 in step 908 in case the antenna 0 is selected while transmitting the SRS to antenna 1 in step 908 if not.

Figure 10:
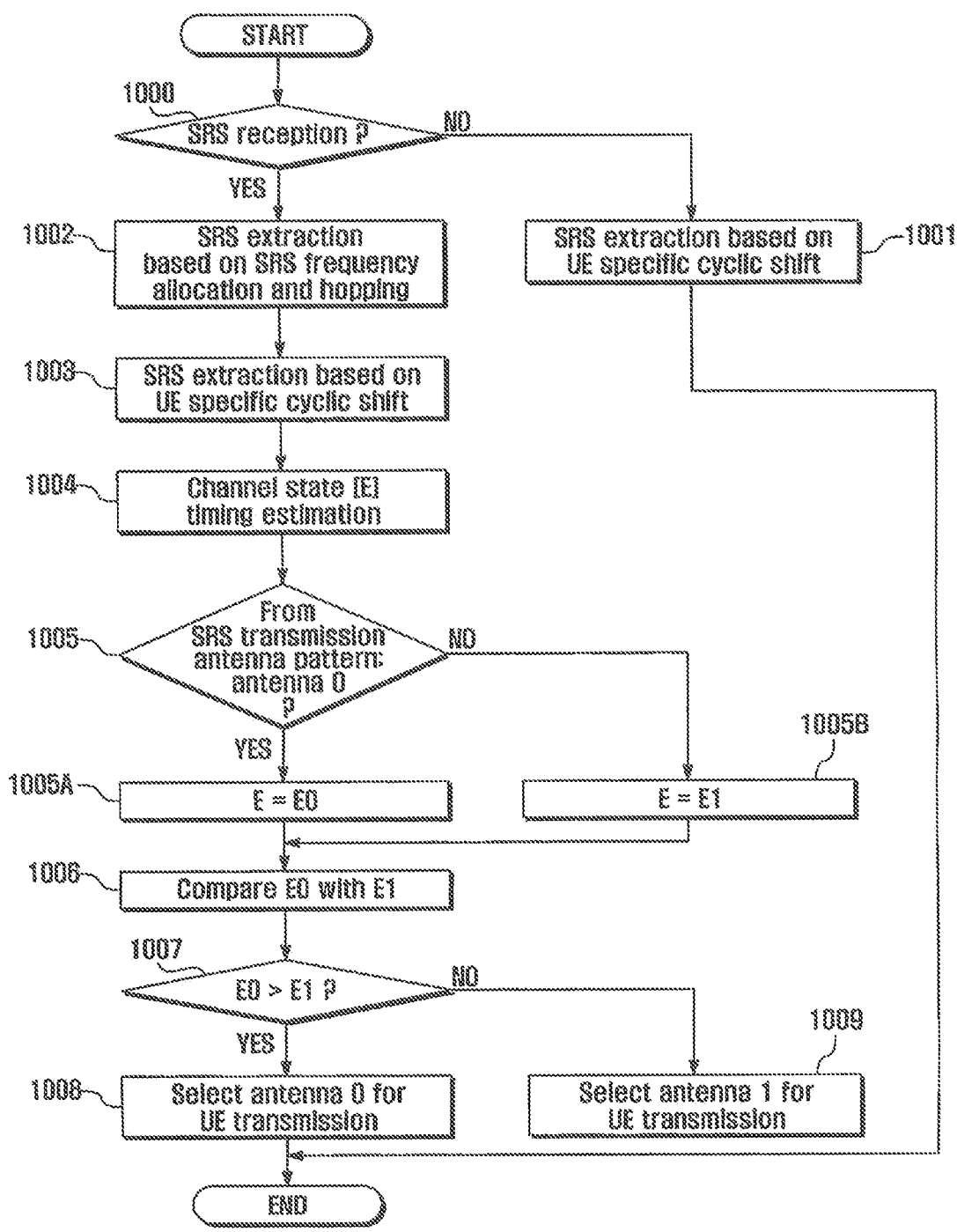
FIG. 10 is a drawing illustrating a signal reception operation procedure of a base station according to an embodiment of the present invention.

FIG. 10 is a drawing illustrating a signal reception operation procedure of a base station according to the first embodiment of the present invention.

Referring to FIG. 10, the base station determines whether the point of time of receiving from the terminal is a point of time when the SRS is transmitted in step 1000. If it is not the point of time of SRS reception, the base station performs a data/control information reception process in step 1001. If the base station determines that it is the point of time of SRS reception, firstly the base station separates the SRS from different terminals out of the frequency domain by using an SRS hopping pattern and allocation information in step 1002. The base station also separates the SRS of the terminals multiplexed to the same frequency domain from a code domain by using a cyclic shift which is different for each terminal in step 1003. The base station performs the channel estimation from the separated SRS in step 1004 and determines which number antenna transmitted the SRS which is currently received from the SRS transmit antenna index. As described above, the base station according to the present invention can determine which antenna of the terminal transmitted the SRS which is received from the terminal in a specific transmission point of time by using the SRS transmit antenna index. According to the present invention, after determining the SRS transmit antenna of the terminal through the above described process, the base station can select the antenna having an excellent channel condition as a transmit antenna of the terminal. This will be described below in step 1006. The procedure step 1006 will be described in detail.

When the base station determines the SRS received from the terminal was transmitted from the antenna 0, the base station stores the current estimation value E as an estimation value (E0) for antenna 0 while storing as an estimation value (E1) for antenna 1 if not. Thereafter, the base station compares two estimation values of E0 and E1 in step 1006 and determines which antenna's channel estimation value is better in step 1007. If it is determined that E0 is greater than E1, the antenna 0 is selected as a transmit antenna of terminal in step 1008 and the antenna 1 is selected as a transmit antenna of terminal in step 1009.

Second Embodiment

The second embodiment illustrates an SRS transmit antenna pattern of the present invention, when a terminal has more than two transmit antennas, as in the LTE-Advanced system.

Figure 11:
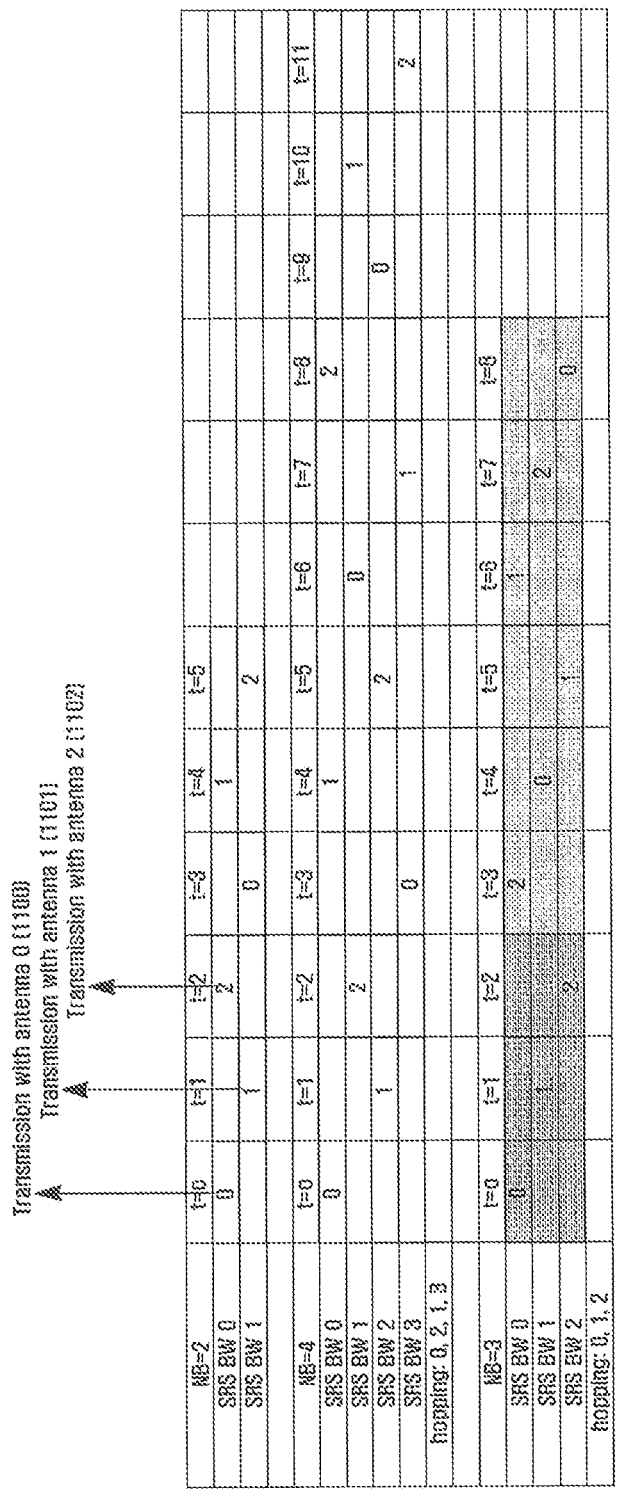
FIG. 11 is a drawing illustrating a sounding reference signal transmit antenna pattern according to an embodiment of the present invention where a terminal is equipped with three antennas.

FIG. 11 illustrates the SRS transmit antenna pattern when the invention is applied to the case where the terminal has three antennas. When the value $N_b$ cannot be divided by 3, which is the number of terminal antenna, antenna 0 1100, antenna 1 1101, antenna 2 1102 are used for the SRS transmission in turns. However, when the value $N_b$ can be divided by 3 which is the number of terminal antenna ($N_b=3$ of FIG. 11), the terminal groups by combining three SRS transmission points of time corresponding to the number of the SRS transmission band. The SRS is transmitted in the order of antenna 0, antenna 1, and antenna 2 in a first transmission section which is a transmission period for first group (V=0, 1, 2). In a second transmission section which is a transmission period for the next group (t'=3, 4, 5), an index in which the value of [M/2] *[t'/$N_b$] is added to the transmit antenna pattern of the first group and then is operated by the modulo M is applied. The next group (t'=6, 7, 8) also applies the index which is calculated by repeating the above process for the transmit antenna pattern of the first group. Equation (3) illustrates the above described SRS transmit antenna pattern.

$$T[t'] = \begin{cases} t' \bmod M & \text{when } N_b \bmod M \neq 0 \\ [t' \bmod M = \lfloor M/2 \rfloor \cdot \lfloor t'/N_b \rfloor] \bmod M & \text{otherwise} \end{cases} \quad (3)$$

Figure 12:
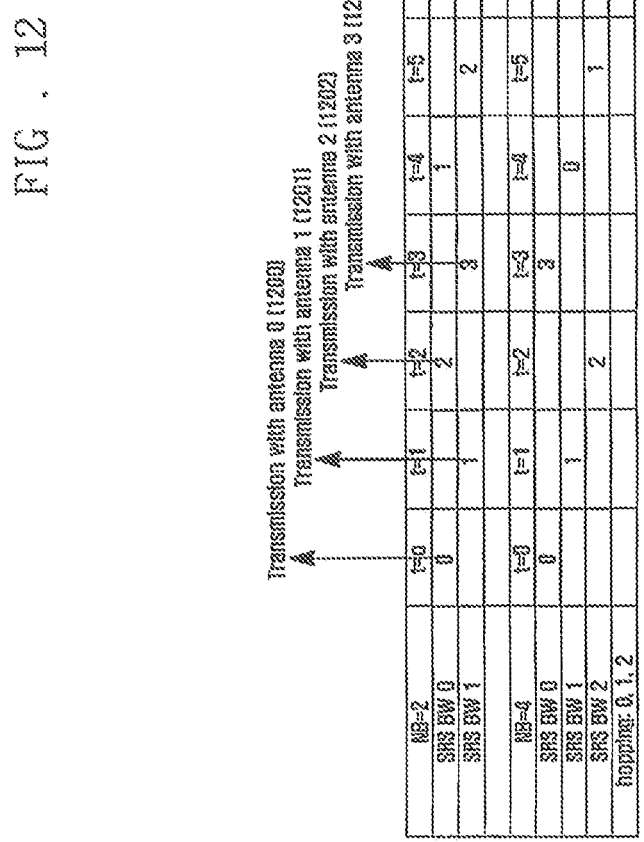
FIG. 12 is a drawing illustrating a sounding reference signal transmit antenna pattern according to an embodiment of the present invention where a terminal is equipped with four antennas.

FIG. 12 is a drawing illustrating an SRS transmit antenna pattern according to the present invention in case where a terminal is equipped with four antennas.

Referring to FIG. 12, firstly, if $N_b$ is an odd number, antenna 0 1200, antenna 1 1201, antenna 2 1203, and antenna 3 1204 transmit the SRS while being repeated in order. As to the number K of the SRS transmission point of time (SRS transmit antenna pattern period) which is necessary in order that the SRS is sent to the entire data transmission band if $N_b$ is an even number. An initial section V=0, ..., K/2−1 is divided equally and the process where antenna 0, antenna 1, and antenna 2, the antenna 3 transmit SRS in order is repeated in a first section (t'=0, ..., K/4−1). In a second section (t'=K/4, ..., K/2−1), the transmit antenna index is applied in reverse order of the SRS transmit antenna index of the first section. Moreover, two is added to the transmit antenna index of the initial section t'=0, ..., K/2−1 and the operation of modulo M is performed such that the SRS transmit antenna index of t'=K/2, ..., K−1 section can be obtained. When $N_b$ is two, antenna 0, antenna 1, antenna 2, and antenna 3 transmit SRS in order in the initial section t'=0, ..., K/2−1, and the antenna index of the next section t'=K/2, ..., K−1 is obtained by adding one to the antenna index of previous section t'=0, ..., K/2−1. This is expressed in Equation (4).

$$T[t'] = \begin{cases} t' \bmod M & [N_b : \text{Odd}] \\ t' \bmod M & [N_b = 2, t' < K/2] \\ [T[t' - K/2] + 1] \bmod N_b & [N_b = 2, K/2 \leq t' < K] \\ t' \bmod M & [N_b > 2 \text{ and even}, t' < K/4] \\ [T[K/4 - 1 - t' \bmod N_b] & [N_b > 2 \text{ and even}, K/4 \leq t' < K/2] \\ [T[t' - K/2] + 2] \bmod M & [N_b > 2 \text{ and even}, K/2 \leq t' < K] \end{cases} \quad (4)$$

A base station, a terminal transceive structure, and an operation procedure of this embodiment are very similar to the first embodiment mentioned above. In the second embodiment, the number of channel estimation obtained from the SRS increases as much as the number of antennas of the terminal is increased in comparison with the first embodiment, and accordingly, the number of comparison operations for selecting an antenna is increased.

Figure 13:
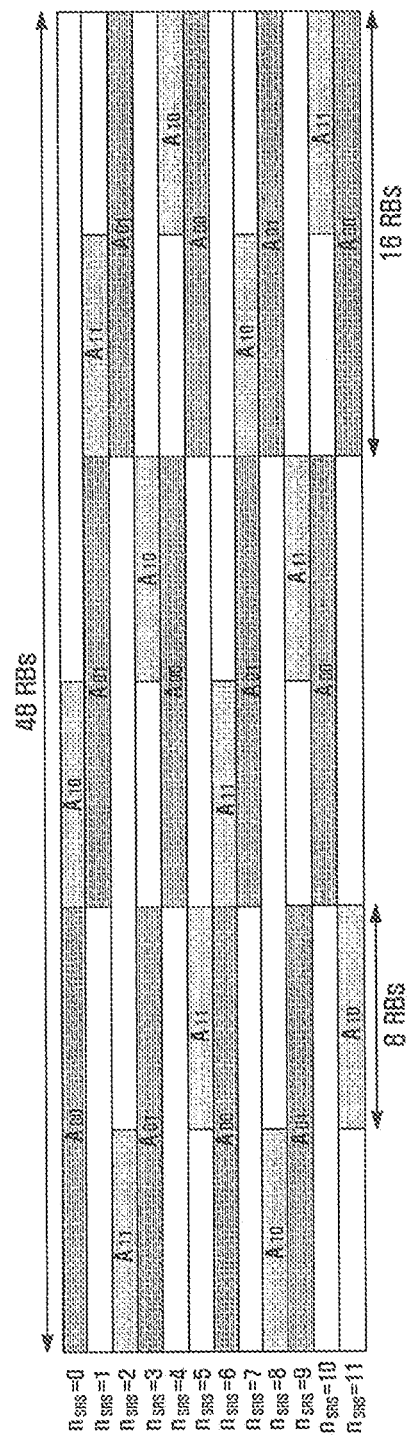
FIG. 13 is a drawing illustrating an example of FIG. 5 of the present invention with a sounding reference signal hopping structure of tree structure where a terminal is equipped with two antennas.

FIG. 13 is a redrawing of above illustrated FIG. 5. FIG. 5 illustrates individually according to the number of the SRS band while FIG. 13 combines the SRS bands into one category such that it will be helpful for clearly explaining the principle of operation of the invention in a frequency and a time axis. In FIG. 13, assuming that a level allocated to the terminal is b, $N_b$ is defined as the number of SRS BW generated from one SRS BW of the upper level. At this time, the period K which is required for the SRS to be transmitted through the entire sounding band is defined as $$K = 2 \prod_{b'=0}^{b} N'_b.$$

For example, as shown in FIG. 13, in the case where b=2 is allocated to the terminal, and if $N_0=1$ when b=0 (one SRS BW in the sounding band), if $N_1=3$ when b=1 (three SRS BW generation at most upper b=0 corresponding to the sounding band, level b=1 lower of SRS BW light grey of FIG. 13), if $N_2=2$ when b=2 (two SRS BW generation at one SRS BW of level b=1, dark grey of FIG. 13), a corresponding terminal has $N_0 N_1 N_2 = 6$ SRS BW in the entire sounding band, and the transmission period K which is required for the SRS BWs to be transmitted to the entire sounding band becomes twelve. Accordingly, when the embodiment of FIG. 5 of the invention is applied as shown in FIG. 13, the SRS transmission period of a total of twelve times is divided into half such that it shows an SRS transmission antenna index pattern having the correlation that complements each other. In addition, each antenna of the terminal transmits the SRS to the entire sounding band.

Figure 14:
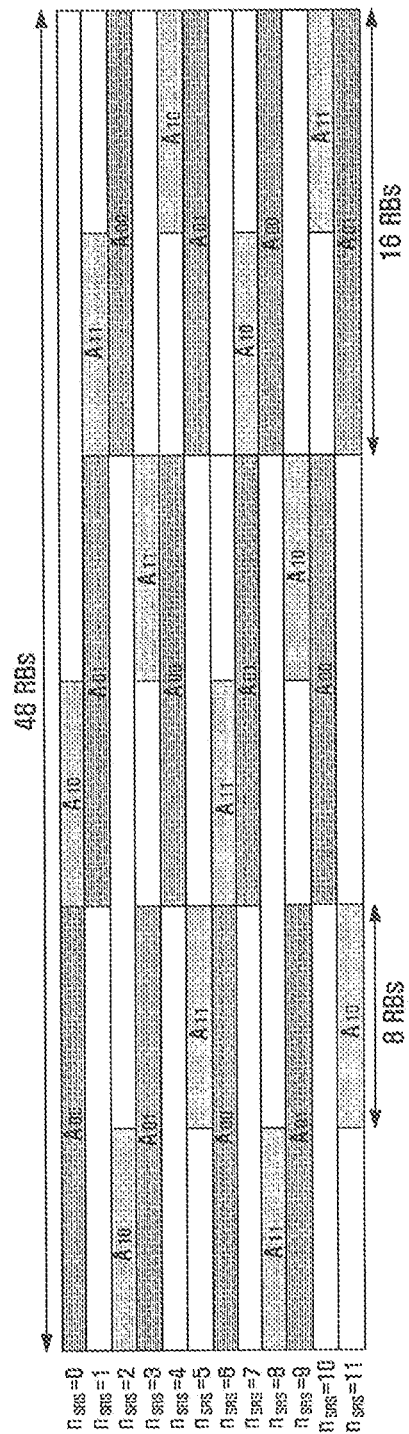
FIG. 14 is a drawing illustrating an example of FIG. 6 of the present invention with a sounding reference signal hopping structure of tree structure where a terminal is equipped with two antennas.

FIG. 14 is a drawing illustrating an example of above described FIG. 6 with an SRS hopping structure of tree structure. The operation is identical with that of FIG. 13.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of sounding reference signal (SRS) transmission in a user equipment (UE) in a communications system supporting multiple antennas and SRS hopping, the method comprising:
    identifying a transmission time of the SRS;
    setting a transmission band for transmitting the SRS;
    generating the SRS to be transmitted to a base station;
    determining an antenna index for transmitting the SRS; and
    transmitting the SRS to the base station according to the antenna index,
    wherein the antenna index is determined by a function based on the transmission time, a UE-specific parameter for an SRS bandwidth and a frequency hopping parameter of the SRS.

2. The method of claim 1,
wherein the antenna index is generated by a following set of equations:

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases},$$

$$\beta = \begin{cases} 1 & \text{where } K \bmod 4 = 0 \\ 0 & \text{otherwise} \end{cases}$$

$$K = \prod_{b'=b_{hop}}^{B_{SRS}} N_{b'}$$

where $n_{SRS}$ is the transmission time, a $(n_{SRS})$ is the antenna index, $B\_{SRS}$ is the UE-specific parameter for the SRS bandwidth, $b\_{hop}$ is the frequency hopping parameter of the SRS, and $N_{b'}$ is associated with a number of the SRS bandwidth.

3. The method of claim 1,
wherein the antenna index is 0110, and
wherein 0 of the antenna index 0110 is an index of a first antenna and 1 of the antenna index 0110 is an index of a second antenna.

4. The method of claim 3, wherein the antenna index 0110 and an antenna index that is a complementary form of the antenna index 0110 are alternately repeated, when the number of transmission bands is a multiple of 4.

5. The method of claim 1,
wherein the antenna index is 01 when the number of transmission bands is an odd number, and
wherein 0 of the antenna index 01 is an index of a first antenna and 1 of the antenna index 10 is an index of a second antenna.

6. A method of sounding reference signal (SRS) reception in a base station in a communications system supporting multiple antennas and SRS hopping, the method comprising:
identifying an SRS reception time;
receiving the SRS through a predetermined transmission band at the SRS reception time; and
determining which antenna of a user equipment (UE) transmitted the SRS by supporting an antenna index,
wherein the antenna index is determined by a function based on a transmission time, a UE specific parameter for an SRS bandwidth and a frequency hopping parameter of the SRS.

7. The method of claim 6,
wherein the antenna index is generated by a following set of equations:

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases},$$

$$\beta = \begin{cases} 1 & \text{where } K \bmod 4 = 0 \\ 0 & \text{otherwise} \end{cases}$$

$$K = \prod_{b'=b_{hop}}^{B_{SRS}} N_{b'}$$

where $n_{SRS}$ is the transmission time, a $(n_{SRS})$ is the antenna index, $B\_{SRS}$ is the UE-specific parameter for the SRS bandwidth, $b\_{hop}$ is the frequency hopping parameter of the SRS, and $N_{b'}$ is associated with a number of the SRS bandwidth.

8. The method of claim 6,
wherein the antenna index is 0110, and
wherein 0 of the antenna index 0110 is an index of a first antenna and 1 of the antenna index 0110 is an index of a second antenna.

9. The method of claim 8, wherein an antenna index 0110 and an antenna index that is a complementary form of the antenna index 0110 are alternately repeated, when the number of transmission bands is a multiple of 4.

10. The method of claim 6,
wherein the antenna index is 01 when the number of transmission bands is an odd number, and
wherein 0 of the antenna index 01 is an index of a first antenna and 1 of the antenna index 01 is an index of a second antenna.

11. An apparatus for transmitting a sounding reference signal (SRS) in a mobile communications system supporting multiple antennas and SRS hopping, the apparatus comprising:
an SRS hopping generator for identifying a transmission time and setting a transmission band for transmitting the SRS;
an SRS sequence generator for generating an SRS to be transmitted to a base station;
an SRS transmit antenna index generator for determining an antenna index for transmitting the SRS; and
an SRS transmit antenna selector for transmitting the SRS to the base station according to the antenna index,
wherein the antenna index is determined by a function based on the transmission time, a UE specific parameter for an SRS bandwidth and a frequency hopping parameter of the SRS.

12. The apparatus of claim 11,
wherein the antenna index is generated by a following set of equations:

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases},$$

$$\beta = \begin{cases} 1 & \text{where } K \bmod 4 = 0 \\ 0 & \text{otherwise} \end{cases}$$

$$K = \prod_{b'=b_{hop}}^{B_{SRS}} N_{b'}$$

where $n_{SRS}$ is the transmission time, a $(n_{SRS})$ is the antenna index, $B\_{SRS}$ is the UE-specific parameter for the SRS bandwidth, $b\_{hop}$ is the frequency hopping parameter of the SRS, and $N_{b'}$ is associated with a number of the SRS bandwidth.

13. The apparatus of claim 11,
wherein the antenna index is 0110, and
wherein 0 of the antenna index 0110 is an index of a first antenna and 1 of the antenna index 0110 is an index of a second antenna.

14. The apparatus of claim 13, wherein the antenna index 0110 and an antenna index that is a complementary form of the antenna index 0110 are alternately repeated, when the number of transmission bands is a multiple of 4.

15. The apparatus of claim 11,
wherein the antenna index is 01 when the number of transmission band is an odd number, and
wherein 0 of the antenna index 01 is an index of a first antenna and 1 of the antenna index 01 is an index of a second antenna.

16. An apparatus for receiving a sounding reference signal (SRS) in a mobile communications system supporting multiple antennas and SRS hopping, the apparatus comprising:

a communication unit for receiving the SRS through a predetermined transmission band at an SRS reception time; and an SRS transmit antenna decision unit for determining which antenna of a user equipment (UE) transmitted the SRS by supporting an antenna index, wherein the antenna index is determined by a function based on a transmission time, a UE-specific parameter for an SRS bandwidth and a frequency hopping parameter of the SRS.

17. The apparatus of claim 16, wherein the antenna index is generated by a following set of equations:

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases},$$

$$\beta = \begin{cases} 1 & \text{where } K \bmod 4 = 0 \\ 0 & \text{otherwise} \end{cases}$$

$$K = \prod_{b'=b_{hop}}^{B_{SRS}} N_{b'}$$

where $n_{SRS}$ is the transmission time, a $(n_{SRS})$ is the antenna index, $B\_{SRS}$ is the UE-specific parameter for the SRS bandwidth, $b\_{hop}$ is the frequency hopping parameter of the SRS, and $N_{b'}$ is associated with a number of the SRS bandwidth.

18. The apparatus of claim 16, wherein the antenna index is 0110, and wherein 0 of the antenna index 0110 is an index of a first antenna and 1 of the antenna index 0110 is an index of a second antenna.

19. The apparatus of claim 18, wherein the antenna index 0110 and an antenna index that is a complementary form of the antenna index 0110 are alternately repeated, when the number of transmission bands is a multiple of 4.

20. The apparatus of claim 16, wherein the antenna index is 01 when the number of transmission bands is an odd number, and wherein 0 of the antenna index 01 is an index of a first antenna and 1 of the antenna index 01 is an index of a second antenna.

* * * * *